United States Patent
Pelley et al.

(10) Patent No.: US 8,014,682 B2
(45) Date of Patent: Sep. 6, 2011

(54) FREE-SPACE OPTICAL COMMUNICATION SYSTEM

(75) Inventors: Perry H. Pelley, Austin, TX (US); Lucio F. C. Pessoa, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 722 days.

(21) Appl. No.: 12/105,423

(22) Filed: Apr. 18, 2008

(65) Prior Publication Data

US 2009/0263138 A1    Oct. 22, 2009

(51) Int. Cl.
*H04B 10/00* (2006.01)

(52) U.S. Cl. ............... 398/164; 398/131; 398/129

(58) Field of Classification Search ............ 398/164, 398/128–131
See application file for complete search history.

(56) References Cited

U.S. PATENT DOCUMENTS

| | | | |
|---|---|---|---|
| 4,937,539 A | 6/1990 | Grinberg et al. | |
| 5,151,814 A * | 9/1992 | Grinberg et al. | 359/209.1 |
| 5,170,269 A * | 12/1992 | Lin et al. | 359/9 |
| 5,204,866 A * | 4/1993 | Block et al. | 372/27 |
| 5,726,786 A | 3/1998 | Heflinger | |
| 5,818,618 A * | 10/1998 | Eastmond | 398/164 |
| 5,838,416 A | 11/1998 | Chen et al. | |
| 5,923,451 A * | 7/1999 | Karstensen et al. | 398/164 |
| 6,002,507 A | 12/1999 | Floyd et al. | |
| 6,289,145 B1 | 9/2001 | Solgaard et al. | |
| 6,374,008 B2 | 4/2002 | Solgaard et al. | |
| 6,410,941 B1 | 6/2002 | Taylor et al. | |
| 6,441,360 B1 | 8/2002 | Bishop et al. | |
| 6,452,700 B1 * | 9/2002 | Mays, Jr. | 359/15 |
| 6,462,847 B2 | 10/2002 | Willebrand | |
| 6,496,291 B1 * | 12/2002 | Raj et al. | 398/164 |
| 6,526,195 B1 | 2/2003 | Henshall et al. | |
| 6,532,093 B2 | 3/2003 | Sun et al. | |
| 6,580,858 B2 * | 6/2003 | Chen et al. | 385/48 |
| 6,618,184 B2 | 9/2003 | Jin et al. | |
| 6,711,318 B2 * | 3/2004 | Hamerly et al. | 385/18 |
| 6,830,221 B1 | 12/2004 | Janson et al. | |
| 7,058,307 B2 * | 6/2006 | Sakanaka | 398/119 |
| 7,146,105 B1 | 12/2006 | Tzeng et al. | |

(Continued)

OTHER PUBLICATIONS

B. Fracasso et al., "Design and Performance of a Versatile Holographic Liquid-Crystal Wavelength-Selective Optical Switch", Journal of Lightwave Technology, vol. 21, No. 10, Oct. 2003.

(Continued)

*Primary Examiner* — Agustin Bello (74) *Attorney, Agent, or Firm* — David G. Dolezal; Robert L. King (57) ABSTRACT

A free-space communication system and method of operation includes a first communication device physically coupled to a substrate and having an optical transmitter for communicating information. A second communication device is physically coupled to the substrate and has an optical receiver for communicating information. An adjustable optical beam deflector is physically coupled to the substrate for optically coupling the first communication device and the second communication device via an optical beam including a free-space optical portion. A feedback system includes a non-optical communication link for receiving information regarding the optical beam. The feedback system controls the adjustable optical beam deflector to direct the optical beam to improve the quality of an optical link incorporating the optical beam. At least one sensor is physically coupled to the substrate for monitoring one or more environmental conditions and providing information of the one or more environmental conditions to the feedback system.

18 Claims, 5 Drawing Sheets

U.S. PATENT DOCUMENTS

| | | | |
|---|---|---|---|
| 7,155,129 B2 * | 12/2006 | Bringans et al. | 398/131 |
| 7,180,929 B2 | 2/2007 | Kuzma | |
| 7,373,044 B2 * | 5/2008 | Sekiya et al. | 385/36 |
| 7,489,840 B2 * | 2/2009 | Sekiya et al. | 385/36 |
| 7,805,080 B2 * | 9/2010 | Wang et al. | 398/129 |
| 7,835,647 B2 * | 11/2010 | Beausoleil et al. | 398/131 |
| 2009/0263138 A1 * | 10/2009 | Pelley et al. | 398/131 |

OTHER PUBLICATIONS

R. Colin Johnson, "Intel demos 40-Gbitls Si laser", Electronic Engineering Times, Aug. 27, 2007, p. 6.

Dean Samara-Rubio et al., "Customized Drive Electronics to Extend Silicon Optical Modulators to 4 Gb/s", Journal of Lightwave Technology, vol. 23, No. 12, Dec. 2005, pp. 4305-4314.

John E. Bowers et al., "Hybrid Silicon Evanescent Laser in a Silicon-on-Insulator Waveguide", University of California and Intel Corporation, Optical Society of America 2006.

R. Baets et al., "Silicon Photonics", Ghent University-IMEC, Department of Technology, IEEE, 2007.

Joost Brouckaert et al., "Thin-Film III-V Photodetectors Integrated on Silicon-on-Insulator Photonic ICs", Journal of Lightwave Technology, vol. 25, No. 4, Apr. 2007, pp. 1053-1060.

G. Roelkens et al., "Ultra-thin benzocyclobutene bonding of III-V dies onto SOI substrate", Electronics Letters, Apr. 28, 2005, vol. 41, No. 9.

Non-Published U.S. Appl. No. 12/105,456, Optical Communication Integration, filed on Apr. 18, 2008, showing Perry H. Pelley as the first named inventor.

\* cited by examiner

FREE-SPACE OPTICAL COMMUNICATION SYSTEM

BACKGROUND OF THE INVENTION

1. Field of the Invention

This invention relates in general to information systems and more specifically to a free-space optical system in an information system.

2. Description of the Related Art

Information systems such as computer systems, cellular phones, wireless devices, PDA's, and electronic control systems for automobiles utilize multiple integrated circuit chips for performing functions of the system. These integrated circuit chips are communicatively coupled via wired busses e.g. wires or circuit traces for exchanging information.

Recently, systems have been proposed where information may be exchanged between devices of an information system with optical communication for increasing bandwidth and speed. One solution is to use wave guides for carrying the optical signals between chips. One example is the use of wave guides to exchange information between a processor and a memory.

One problem with the use of a waveguide is that it may be difficult to align components to a wave guide on a circuit board. Another problem is that the waveguides themselves add expense to the system.

Information may be transferred optically where at least some portion of the optical link passes through free-space (i.e. not through a wave guide). These systems may be referred to free-space optical systems in that at least some portion of the link passes through free-space. An optical link passing through "free-space" includes not only an optical link passing through atmospheric air, but also includes an optical link passing through any gas, vacuum, or liquid where the container of such medium does not act as a waveguide.

One problem with a free-space optical system is that the components of the link must be aligned within certain tolerances to meet information transmission requirements. For example, the optical transmitter, deflector structures, and the optical receiver must be aligned to ensure a desired level of information transmission.

Although care can be taken to ensure that the components are aligned when assembled, such systems may be subjected to vibration (e.g. dropping) or temperature variation during use. For example, components of an optical link may become misaligned if a cell phone or notebook computer is accidentally dropped on a surface. Furthermore, the cost for designing and assembling components that are precisely aligned may be cost prohibitive.

What is needed is an improved system for a free-space optical communication system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

Figure 1:
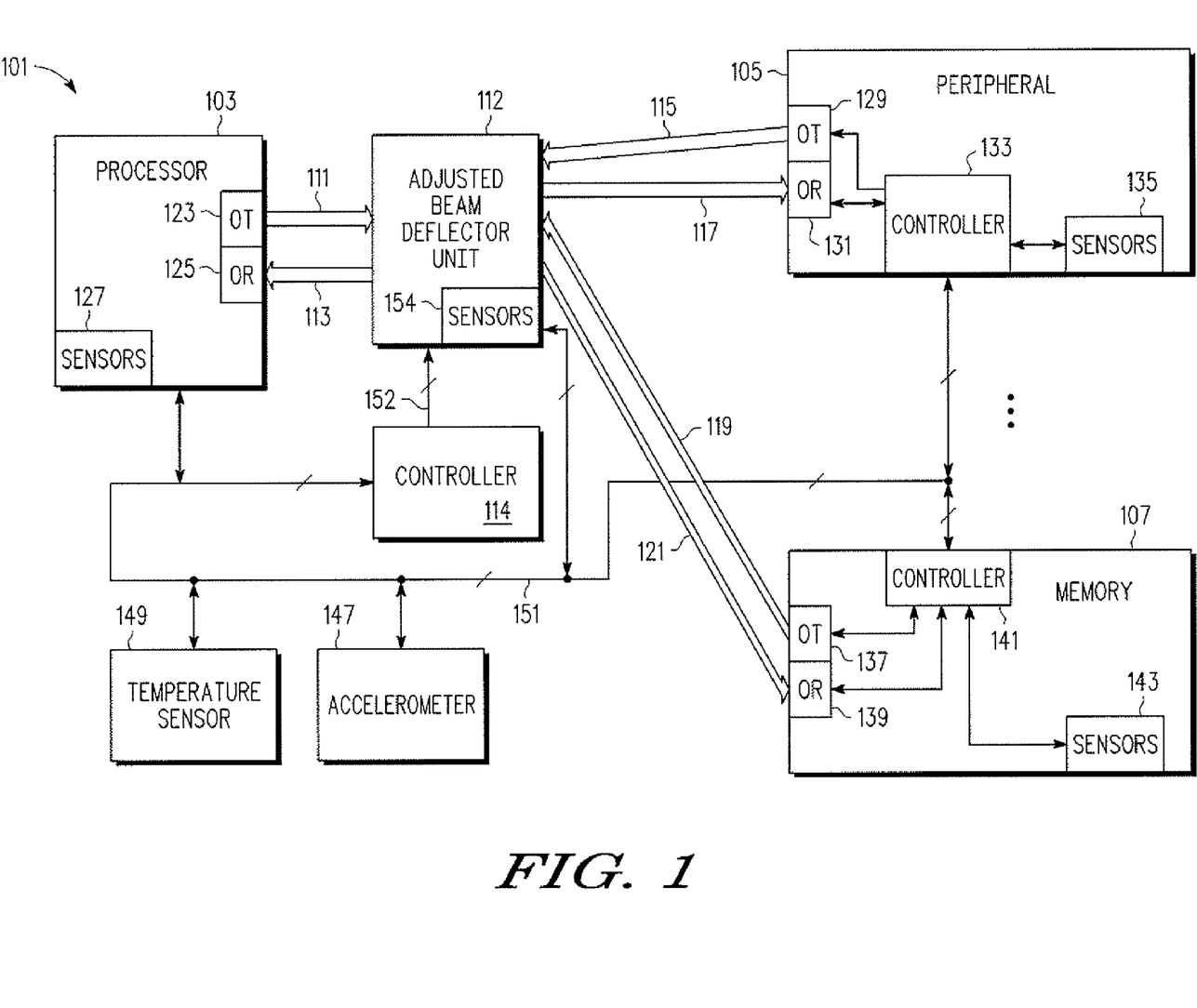
FIG. 1 is a block diagram of a free-space optical communication system according to one embodiment of the present invention.

FIG. 1 is a block diagram of a free-space optical communication system according to one embodiment of the present invention. System 101 includes an adjustable beam deflector unit (ABDU) 112 for adjusting a deflection of an optical beam of a free-space optical communication system. The adjustments to the ABDU are made by a feedback system using information provided over a non optical communication link. Accordingly, if system 101 is subjected to an excessive vibration or temperature variation or if the components of the free-space optical system become misaligned for other reasons, system 101 may readjust the defection of the optical beam to correct for any misalignment due to these reasons.

System 101 includes a number of communication devices (e.g. processor 103, memory 107, and peripheral 105) that communicate with each other via optical beams. For example, in the embodiment of FIG. 1, processor 103 provides information to memory 107 via an optical beam including free-space optical beam portions 111 and 121 and receives information from memory 107 via an optical beam including free-space optical beam portions 119 and 113. Processor 103 provides information to peripheral 105 via an optical beam including free-space optical beam portions 111 and 117 and receives information from peripheral 105 via an optical beam including free-space optical portions 113 and 115. An optical beam is a beam of radiation having wavelengths in the optical range (e.g. signals with wavelengths in the range of approximately 200-2000 nm).

In one embodiment, processor 103 is the system processor for controlling system 101. Peripheral 105 maybe any one of a number of peripheral devices, (e.g. keyboard controller, mouse controller, external network controller, external wireless transceiver, CD drive controller, DVD drive controller, a hard drive controller, or a socket mounted device). Memory 107 may be the main operating memory for system 101 and may include one or more chips (e.g. as in a DRAM or SRAM type memory) or it may be a non volatile memory (e.g. flash or hard drive memory). Other systems may include a greater number of communication devices (e.g. more memories, additional processors, and other peripherals) that communicate by optical beams that include free-space optical beam portions.

In the embodiment shown, each communication device includes an optical transmitter (OT) and an optical receiver (OR). Processor 103 includes OT 123 and OR 125, peripheral 105 includes OT 129 and OR 131, and memory 107 includes OT 137 and OR 139. Information is provided to the optical transmitters to generate an optical beam with the information encoded therein. The optical transmitters include circuitry for converting information from one form (e.g. electrical signals) and devices (e.g. a laser) for generating an optical beam that includes the information. In one embodiment, the OT and processing circuitry of processor 103 are located on the same integrated circuit die. See for example the application entitled "Optical Communication Integration," having a common assignee, having inventors Perry H. Pelley and Dennis C. Hartman, and having the same filing date, all of which is hereby incorporated by reference in its entirety.

Each optical receiver includes devices (e.g. a photodiode) for receiving the optical beam and converting the information into another form (e.g. electrical signals) to be used by the receiving device.

The free-space optical beam portions shown in FIG. 1 represent optical beams of one or more optical frequencies. In some embodiments, each frequency may comprise an independent data stream which may be separated out by an optical receiver or which may be directed to a different communication device via ABDU 112. In some embodiments, each beam portion may comprise multiple parallel beams, each of which may have multiple frequencies in some embodiments. For example, beam portion 111 may include 8 parallel beams for implementing a parallel optical bus. In FIG. 1, the beam portions are shown as unidirectional. However, a beam portion may be implemented where the corresponding beam portion in the opposite direction (e.g. portions 111 and 113) is in the same physical space but at different frequencies.

With a free-space optical communication system, it is important for the free-space optical beam to strike the sensing circuitry (e.g. photodiode) at a targeted location. The closer the beam is to the targeted location, the better the performance of the communication link (e.g. the greater the signal-to-noise ratio). Misalignment of a beam may occur in some embodiments due to excessive vibration where components of system 101 may become partially dislodged or moved due to the vibration. Also, a sudden change in temperature may result in a movement of components with respect to each other. For example, where the communication devices are physically coupled to a substrate (e.g. circuit board 201), a change in temperature may cause the substrate to bow where the communications devices move with respect to each other.

System 101 includes a feedback system for obtaining information from a communication device receiving an optical beam and adjusting the adjustable beam deflector unit 112 to direct the beam to the targeted location of an optical receiver to improve the quality of the optical link if the components become misaligned. In one embodiment, the feedback may be used to increase or decrease beam intensity to minimize power while maintaining signal-to-noise ratio.

In the embodiment shown, the feedback system includes a non optical communications link 151 that is communicatively coupled to each communication device and a controller 114 communicatively coupled to control ABDU 112 for directing the optical beams. In one embodiment, processor 103 is part of the feedback system. In such embodiments, processor 103 receives information regarding the reception of an optical beam from the controllers 133 and 141 of peripheral 105 and memory 107 via link 151 and calculates appropriate adjustments needed to ADBU 112. Processor 103 provides those adjustments to controller 114 to adjust ADBU 112 to direct the optical beams with respect to the optical receivers (131, 139, and 125) for improved information transmission. Processor 103 uses the information from its own OR 125 to adjust ABDU 112 for directing free-space optical beams hitting OR 125.

In one embodiment, the feedback system receives information from the receiving device that is indicative of the accuracy of an optical beam striking the desired target of the optical receiver. For example, in one embodiment, the feedback system receives optical signal intensity information, which is an indication of the intensity of the received optical beam at a receiver. The greater the intensity, the closer the beam is centered on its desired target. In other embodiments, the feedback system may receive information regarding the signal-to-noise ratio of the information received by the receiving communication device. In other embodiments, the optical receiver may also include a number of diodes surrounding the target diode. The surrounding diodes would used to detect if the beam is offset from the target diode. Such information would be used for adjustment of the beam or for cancellation of feed through from adjacent beams.

In other embodiments of a feedback system, controller 114 may include logic or a processor that receives the information from the communication devices (including processor 103) via link 151 and calculates the adjustments needed for ABDU 112. In one embodiment, processor 103 (or controller 114 if it includes a processor) executes a software program for adjusting ABDU 112. In other embodiments, such adjustments may be made by firmware or hardware.

System 101 also includes a number of sensors for sensing environmental conditions of system 101. Processor 103, peripheral 105, memory 107, and ABDU 112 each include sensors 127, 135, 143, and 154 respectively. These sensors maybe temperature or vibration sensors (e.g. accelerometers) for sensing temperature and vibrations. System 101 also includes temperature sensor 149 and accelerometer 147. Processor 103 uses the information from these sensors for adjusting ABDU 112 and for anticipating future changes.

In one embodiment, communications link 151 is a serial, wired link. In other embodiments, linked 151 may be implemented as a wired parallel bus. In one embodiment, link 151 may be implemented as an RF communication system (e.g. Ultra Wideband (UWB)). In the embodiment shown, all communication devices, controller 114, sensor 149, and accelerometer 147 are communicatively coupled to link 151. However, in other embodiments, the different devices may be communicatively coupled by various links. For example, processor 103 may be communicatively coupled by a different link to controller 114. In one embodiment, link 151 operates at a considerably lower data rate than those of the optical links of system 101.

Providing a free-space optical system with a feedback system that uses non optical feedback may advantageously provide the system with a way to adjust the optical beams even when factors such a sharp vibration would cause a misalignment that completely cuts off the optical connection. For example, if system 101 were dropped on the floor and the components were to become misaligned, the feedback system could be used to adjust ABDU 112 to direct the beam such that it strikes a desired target. Furthermore, using the non optical link for feedback frees up bandwidth for the transfer of information over the optical link. If the optical links were used for feedback, then the controllers of the communication devices would have to be configured to add overhead information (or additional over head information) to the optical link.

Figure 2:
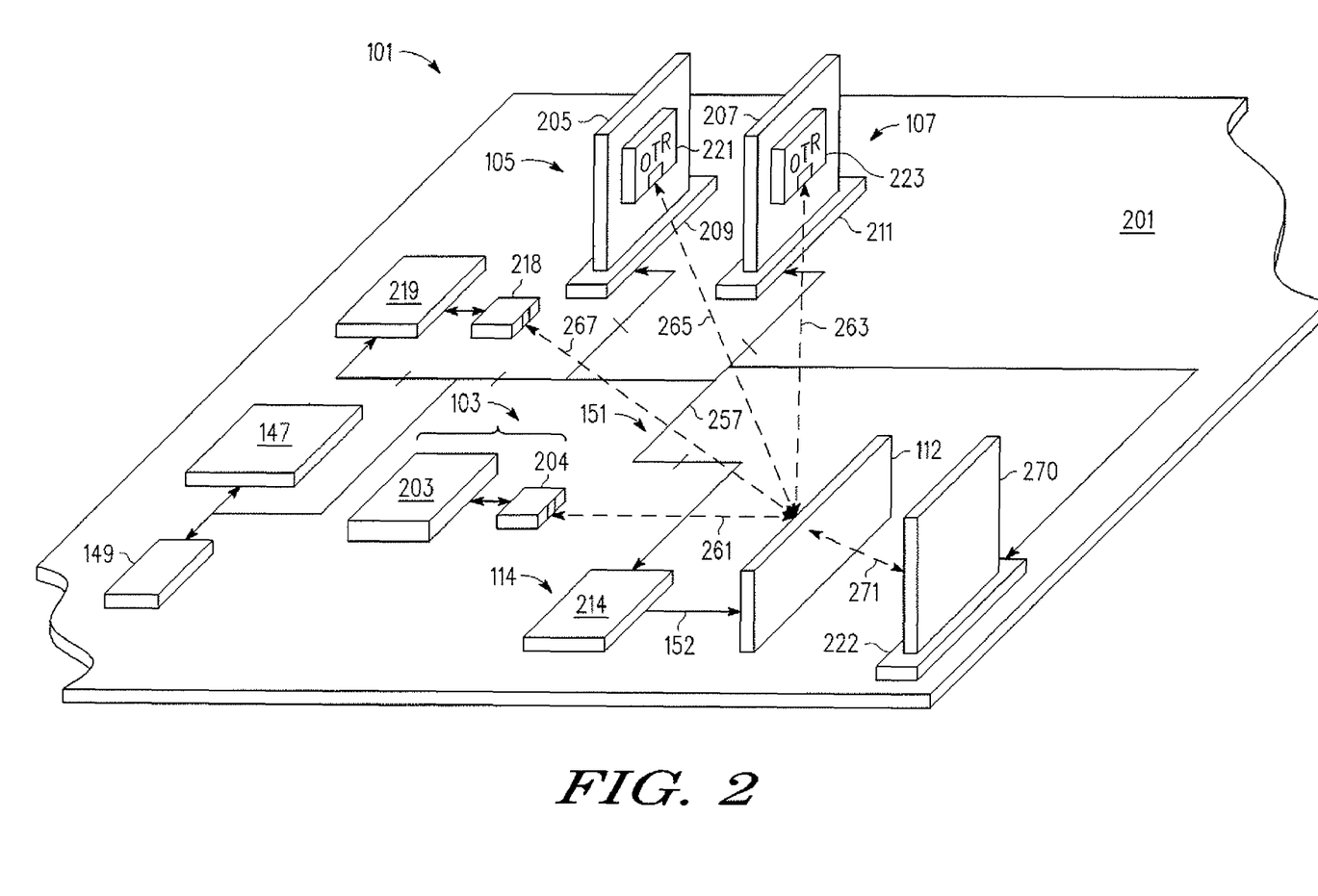
FIG. 2 is a perspective view of a portion of an information system according to one embodiment of the present invention.

FIG. 2 shows a perspective view of one embodiment of a physical implementation of system 101. In the embodiment of FIG. 2, system 101 is implemented on a substrate (circuit board 201), wherein various components of system 101 are implemented in integrated circuit package chips (chips) physically coupled to circuit board 201. In FIG. 2, processor 103 is implemented in chip 203 and chip 204 mounted to board 201. The optical transmitter 123 and optical receiver 125 of processor 103 are implemented in transceiver chip 204 connected via a wired connection (e.g. circuit traces) to chip 203. Link 151 is implemented as circuit traces 257. Memory 107 and peripheral 105 are implemented on plug-in cards 205 and 207. Cards 205 and 207 include various chips mounted on the cards for implementing the components of those devices. In the embodiment shown, the optical transmitters and optical receivers of memory 107 and peripheral 105 are implemented in transceiver chips 223 and 221, respectively. The circuitry of cards 205 and 207 are physically coupled to circuit board 201 in that cards 205 and 207 are inserted into sockets 209 and 211, respectively, which are mounted to board 201.

Sensor 149 and accelerometer 147 are each implemented as chips mounted to board 201. Controller 114 is implemented in chip 214. ADBU 112 is mounted to board 201.

In the embodiment shown, an optical link from transceiver chip 204 to transceiver chip 221 includes a free-space optical beam portion 261 and a free-space optical beam portion 265 where ADBU reflects the path of beam portion 261 to the path of beam portion 265 to target the receiving circuitry of transceiver chip 221. The optical beam between chips 221 and 204 includes free-space optical beam portion 265 directed through ADBU 112 to the path of free-space optical beam portion 261. ADBU 112 also directs beam portion 261 to the receiver circuitry of chip 223 via the path of free-space optical beam portion 263. Likewise, the optical beam between chips 221 and 204 includes the path of free-space optical beam portion 265 directed through ADBU 112 to the path of free-space optical beam portion 261.

The embodiment of FIG. 2 includes two additional communication devices. One communication device is implemented in chip 219 and transceiver chip 218, both mounted to board 201. The second device is mounted to card 270 inserted in socket 222. Card 270 includes a transceiver chip (not shown). In one embodiment, card 270 may implement another memory circuit and chips 218 and 219 may implement a peripheral such as a hard drive controller or graphics accelerator.

In the embodiment shown, ABDU 112 reflects the optical beams between transceiver chip 204 and transceiver chips 218, 221, and 223. For example, ABDU 112 reflects optical beam portion 261 to optical beam portion 265 to strike transceiver chip 221. However, the optical beam from chip 204 (portion 261) deflects as it passes though ABDU 112 to card 270 (beam portion 271).

In the embodiment of FIG. 2, the optical beams are shown as two way beams, however, in other embodiments, the beams may be one way. In some embodiments, not all components are optically coupled. For example, a system using optical links might also include a keyboard controller using a conventional wired interface or a hard drive controller using an RF interface.

Also other embodiments may include optical beams between other communication devices of system 101. For example, system 101 may allow for an optical beam generated by transceiver chip 221 to pass through ABDU 112 to card 270, thus allowing direct communication, e.g. between a peripheral and a memory without intermediation of processor 103.

In other embodiments, system 101 may include more than one ABDU. In some embodiments, the optical beams may be deflected by more than one beam deflection unit. In one embodiment, a beam may also be deflected by a fixed beam deflecting unit.

Figure 3:
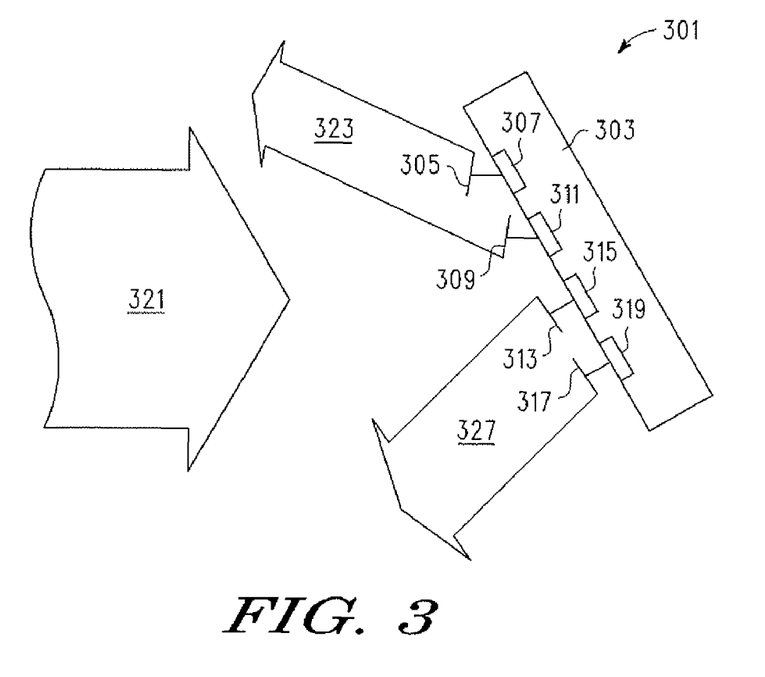
FIG. 3 is a view of an adjustable beam deflector unit according to one embodiment of the present invention.

ABDU 112 includes structures for directing an optical beam. In some embodiments, ABDU 112 includes structures that are reflective (e.g. such as mirrored surfaces). In other embodiments, ABDU 112 includes structures that are transmissive where a beam passes through the structure and is directed in the structure. In some embodiments, the ABDU 112 may include both reflective and transmissive structures FIG. 3 is a diagram of one embodiment of an ABDU according to one embodiment of the present invention. ABDU 301 includes a structure 303 having a number of movable mirrored surfaces 305 309, 313, and 317 that are movable by micro-electro mechanical system (MEMS) devices 307, 311, 315, and 319, respectively. In one embodiment, each mirrored surface is moved to a desired position of reflection by applying a particular voltage or current to its associated MEMS device. In one embodiment, the controlling voltage is generated by a controller (e.g. 112) in response to corrective adjustment information. By moving the mirror surface with a MEMS device, the location of the mirror can be controlled electronically by the feedback system to direct an outgoing beam portion to a desired target by adjusting the angle of reflection. In FIG. 3, incoming beam portion 321 strikes mirrored surfaces 305 and 309 and is reflected as beam portion 323 to a desired target. Also, incoming beam portion 321 is also directed by mirrored surfaces 313 and 317 and is reflected as beam portion 327 to a second desired target. Providing an ABDU with multiple mirror surfaced controlled by MEMS devices provides an ABDU that can "split" an incoming beam into multiple beams to different targets, where each of those beams can be individually directed to a desired target.

In one embodiment, the mirrored surfaces are metal films on independently-controlled MEMS devices. In one embodiment, the MEMS device includes two structures (not shown) that are movable with respect to each other by applying a current or voltage to each structure. In one embodiment, the MEMS structures are made of silicon. The mirrored surface is attached to one structure, and the other structure is fixably coupled to board 201. An optical beam can be directed during operation by moving the structures of the MEMS device with respect to each other. In other embodiments, a MEMS device may have other structures and/or work in other ways.

Figure 4:
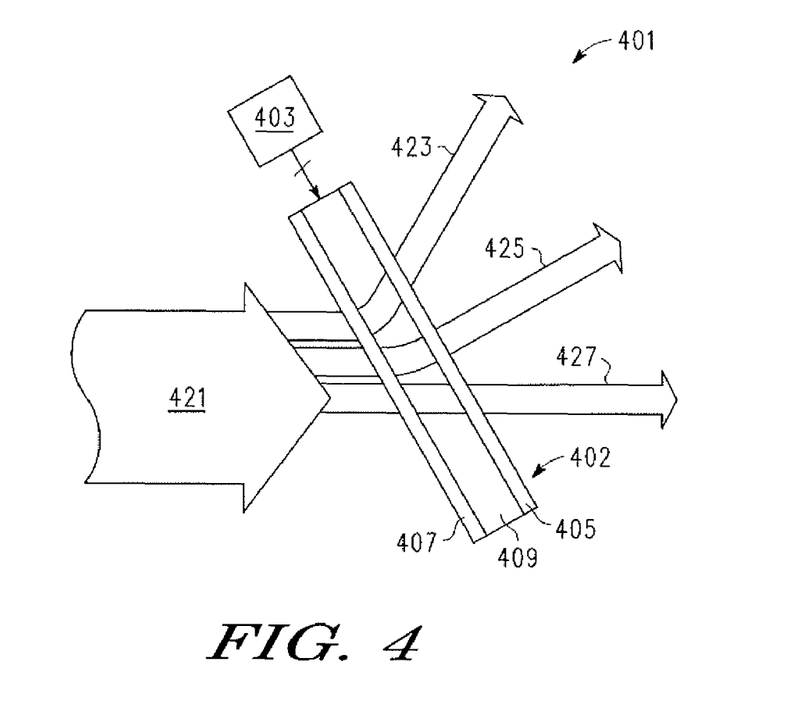
FIG. 4 is a view of an adjustable beam deflector unit according to another embodiment of the present invention.

FIG. 4 is an other embodiment of an ABDU. ABDU 401 includes a liquid crystal beam deflector 402 with a liquid crystal layer 409 between glass layers 407 and 405. Liquid crystal layer 409 includes liquid crystal molecules that, when subject to an electric field, rotate to a degree dependent upon the strength of the electric field. Optical radiation passing through these rotated molecules are defected at an angle depending on the rotation of the molecules. The angle at which optical energy is deflected is dependent upon the strength of the electric field. The electric field at a particular location of layer 409 is controlled e.g. by the intensity of a pulse applied by controller 403 at that location. With some embodiments, light is deflected by different degrees at different locations of layer 409, depending upon the intensity of the signal at that location. Conversely, incoming beam portion 421 can be directed to different targets (e.g. as beam portions 423, 425, and 427) depending upon the strength of the electric field at the locations of layer 409 in which beam portion 421 enters. ABDU 401 is transmissive in that optical radiation passes through deflector 402. In other embodiments, a liquid crystal layer may have other structures and/or work in other ways.

Figure 5:
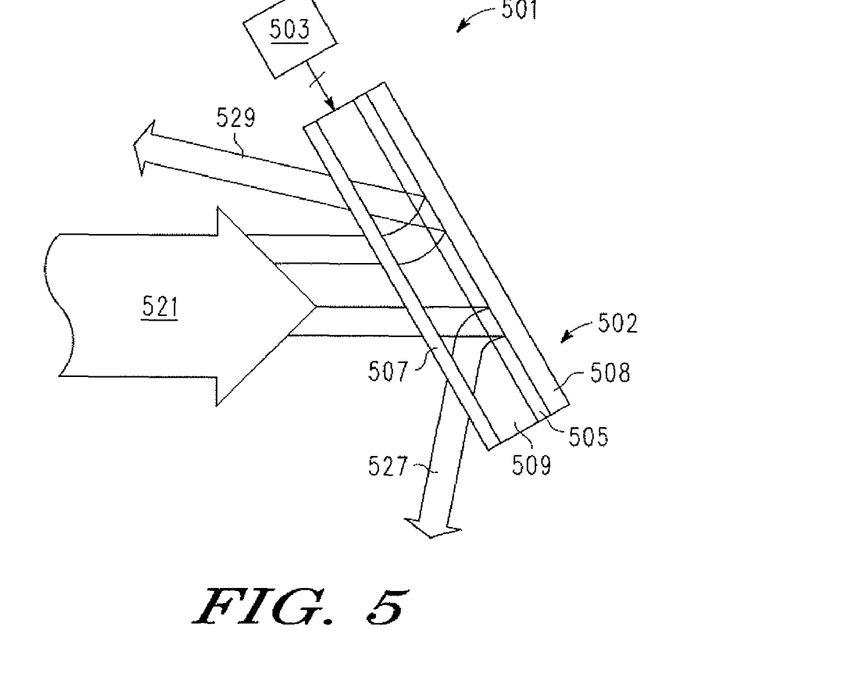
FIG. 5 is a view of an adjustable beam deflector unit according to another embodiment of the present invention.

FIG. 5 is an ABDU according to another embodiment of the present invention. ABDU 501 includes a liquid crystal deflector 502 with a liquid crystal layer 509 located between glass layers 507 and 505. A reflective surface 508 is located on the back side of layer 505. An incoming beam portion 521 is directed by passing through layer 509 according to a field generated by controller 503. After passing through layer 509, the optical beam is reflected back through layer 509 (where it can be further directed by layer 509) as out going beam portions 529 and 527. In this embodiment, ABDU 501 is a reflective ABDU. In some embodiments, mirrored surface 508 may be separated from glass layer 505. In some embodiments, mirrored surface 508 may be located sufficiently away from layer 505 such that an optical beam is not re-reflected back through liquid crystal layer 509.

Figure 6:
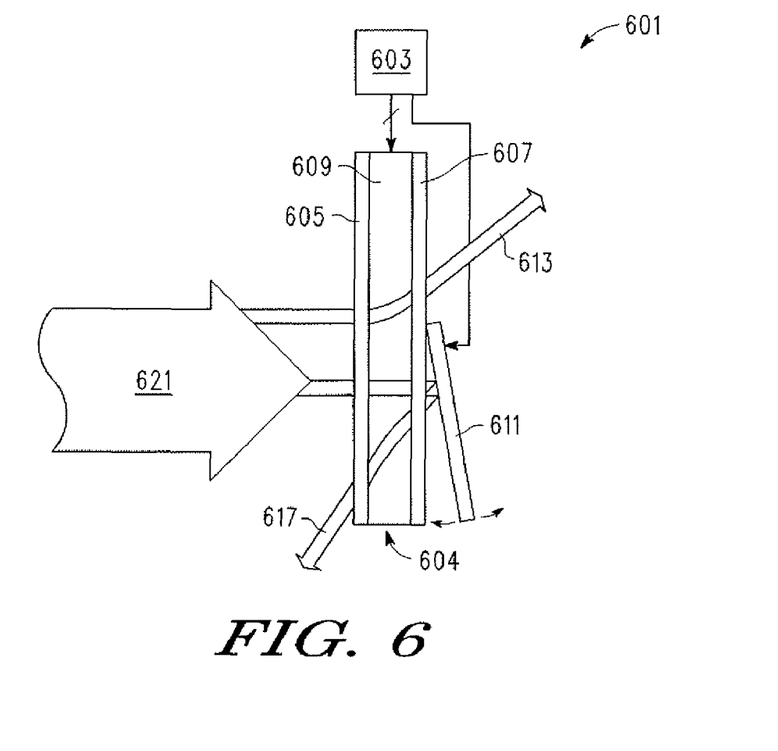
FIG. 6 is a view of an adjustable beam deflector unit according to another embodiment of the present invention.

FIG. 6 is an ABDU according to another embodiment of the present invention. ABDU 601 includes both transmissive and reflective portions. ABDU 601 includes a liquid crystal deflector 604 that includes liquid crystal layer 609 between glass layer 605 and 607. ABDU 601 includes mirrored surface 611 whose position is controlled by a MEMS device. An coming beam portion 621 is directed by liquid crystal layer 609. A portion of beam portion 621 is passed through layer 609 and is directed out as beam portion 613 where the beam is deflected in layer 609. A second portion of beam 621 is directed by layer 609 and then reflected back by mirrored surface 611 through to layer 609 where it can be further directed as optical beam portion 617. With the embodiment of FIG. 6, ABDU 601 can direct a beam through ABDU in one direction and reflect the beam back in a second direction. Accordingly an incoming beam can be directed to receivers on both sides of ABDU 601.

Also with the embodiment of 601, a beam portion 617 can be directed by controlling liquid crystal beam deflector layer 609 and further by moving mirrored surface 611 by controlling the MEMS device. In the embodiment of FIG. 6, both liquid crystal beam deflector layer 609 and mirrored surface 611 are controlled by controller 603. Accordingly, the range adjustment of beam portion 617 can be increased with the use of both liquid crystal and MEMS controlled beam deflection devices.

Figure 7:
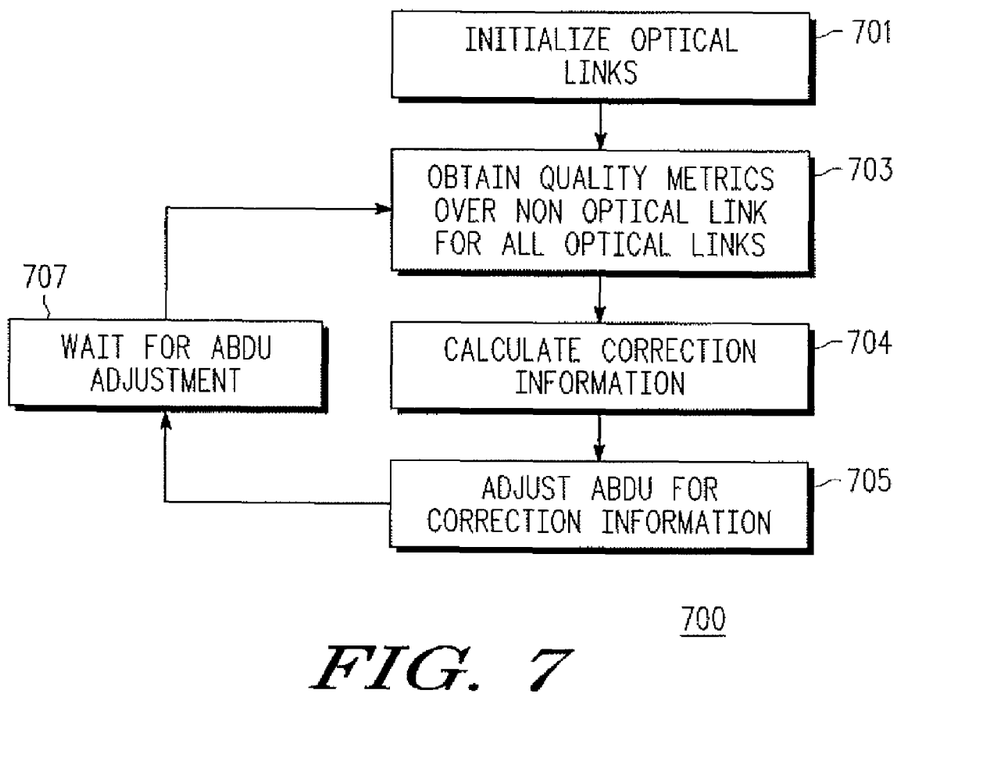
FIG. 7 is a flow diagram describing an operation for adjusting an adjustable beam deflector unit according to one embodiment of the present invention.

FIG. 7 sets for one embodiment for adjusting an ADBU to direct optical beams for realignment during operation of an optical system (e.g. system 101).

In operation 701, the optical links of an optical system are initialized where optical beams are transmitted to transfer information between communication devices of system 101.

In operation 703, the feedback system obtains transmission quality metric information (e.g. optical signal intensity, signal-to-noise ratio information) from the communication devices over non optical link 151. The feedback system also obtains temperature and vibration information as well. In one embodiment, this information may be obtained by processor 103 polling each device on link 151. However, this information may be obtained by other ways in other embodiments.

In operation 704, correction information is calculated (e.g. by processor 103 in one embodiment). The correction information is calculated using the metric information and also sensor information in some embodiments. In 705, the correction information is sent to controller 114 to adjust ABDU 112 for directing any optical beams of an optical link that are below a transmission quality threshold. In some embodiments, operation 704 may comprise predicting future changes in optical quality metrics.

In 707, the feedback circuitry waits a period of time for ABDU 112 to be adjusted and then transitions back to operation 703 where it obtains metric information from the receiving devices again. Accordingly, the feedback system can evaluate the adjustments made in operation 705 and make further adjustments in a subsequent instantiation of operation 705. In the embodiment shown, the feedback system is continually gathering quality metric information and adjusting ADBU 112 to ensure that the optical links of system 101 are operating above a desired threshold.

With the system of FIG. 7, optical beams are continually monitored and directed if necessary to account for changes in relation among the optical transmitter, optical receiver, and deflector units. Such changes may be due e.g. to vibration or changes in temperature. Consequently, if the system is dropped or damaged, the system may still continue to be operable in that the ABDU can be controlled to realign the optical communication links.

Also, in some embodiments, the amount of direction of an optical beam may vary depending on temperature. For example, the deflection characteristics of a liquid crystal layer may vary with temperature. Accordingly, the feedback system of system 101 may be used to compensate for such variation in temperature.

In some embodiments, the feedback system uses the temperature and/or vibration sensor measurements for making corrections for ABDU adjustment. In one embodiment, the extent that the ABDU is moved is based on the amount of vibration or variation in temperature. For example, if the amount of vibration is great (e.g. with a drop of system 101), an optical link may become non aligned by a great margin. Accordingly, the feedback system may significantly alter the position of the ABDU such that the beam may more quickly meet the quality threshold. However, if the amount of vibration or temperature variation is not great, then only a minor amount of adjustment is made.

In some embodiments, the measured vibration and/or temperature may be used to estimate the location that a beam needs to be directed for improved transmission quality.

For example, if the ABDU includes a liquid crystal beam deflector layer (e.g. 409) whose amount of direction is dependent upon temperature, then the feedback system may use the temperature information for adjusting the direction of the liquid crystal layer to compensate for the temperature variation. In some embodiments, the ADBU may include a temperature sensor (e.g. sensor 154) for measuring its temperature. Also, if the amount and direction of substrate warping is dependent upon temperature, then the feedback system may use the temperature information for adjusting the ADBU to compensate for the warping.

In some embodiments, the vibration information may include direction information that indicates the direction of vibration. The feedback system may use this direction information for determining the amount and direction of optical beam directing by the ABDU. For example, if system 101 is dropped in a certain direction, this information may be used to adjust a beam in a certain direction with respect to an optical receiver.

In some embodiments, the feedback system may have memory that allows it to store previous beam directing information with respect to previous measurements of temperature and/or vibration. For example, the feedback system may store a previous ABDU setting with respect to a temperature range that provided the optical link with a sufficient transmission quality. As another example, the memory of the feedback system would store previous adjustment information in regards to specific vibration amplitude and/or direction. The storage of such information may be used to provide for more accurate correction information for adjusting the ABDU. With more accurate information, an optical link may be more quickly brought back into compliance from an alignment altering event.

Although an optical system has been described in regard to its components physically coupled to a circuit board substrate, an optical system with an ABDU and feedback system may be implemented in an optical system where the components are physically coupled to a package substrate. In such an embodiment, the components of the optical system may be encapsulated (either completely or partially) in encapsulant such that the entire optical system is on an integrated circuit chip package. In some embodiments, the package would have cavities for free-space optical beams. In some embodiments, a portion of the encapsulation would be transparent to optical beams.

In other embodiments, the ABDU may be used to direct an optical beam transmitted by one transmitter from one optical receiver of a first communication device to another optical receiver of a second communication device. For example, referring back to FIG. 2, in one embodiment, ADBU 112 may be controllable to direct a beam from transceiver chip 204 to either OTR chip 221 or OTR chip 223 depending upon whether processor 103 desires to communicate with peripheral 105 or memory 107. With such embodiments, the ADBU and non optical feedback would provide an optical system flexibility in allowing a transceiver to communicate with any one of a number of devices without having to have the capability of communicating simultaneously with all.

In some embodiments, the feedback system may be utilized for shutting down an optical link if the feedback system determines that the link is permanently blocked. For example, if a component becomes loose during operation such that the feedback system can not direct a beam sufficiently to recover the link, the feedback system would be able to stop transmission of the beam and report an error. Stopping transmission of the beam would save energy. Also, if a beam becomes greatly misaligned, it may present a safety hazard. Further, an interruption of an optical beam may occur as part of an attempt to break into a system. Accordingly, the shut down feature may increase the security of the system.

In the embodiment shown, ABDU 112 is physically separate from the transceiver chip 204. However, in other embodiments, ABDU 112 may be integrated with transceiver chip 204. Also in some embodiments, ABDU 112 may be integrated with controller 114. In some embodiments, the lens of an optical transmitter may be adjustable as well. Also in some embodiments, circuitry of chips 203 and 204 may be implemented in a single chip.

Also, in some embodiments, the system may include standard optical components such as a lens, a diffraction grating, a filter, a wave guide or other components.

In one embodiment, a system includes a first communication device physically coupled to a substrate and including an optical transmitter for communicating information. The system includes a second communication device physically coupled to the substrate and including an optical receiver for communicating information. The system also includes an adjustable optical beam deflector physically coupled to the substrate for optically coupling the first communication device and the second communication device via an optical beam including a free-space optical beam portion. The system further includes a feedback system including a non-optical communication link for receiving feedback information regarding the optical beam. The feedback system controls the adjustable optical beam deflector to direct the optical beam in response to the feedback information.

In another embodiment, a method includes communicating information from a first communication device physically coupled to a substrate to a second communication device physically coupled to the substrate by using an optical beam. The optical beam includes a free-space optical beam portion. The optical beam is deflected by an adjustable optical beam deflector physically coupled to the substrate. The method includes providing by the second communication device via a non-optical communication link, one or more quality metrics regarding a reception of the optical beam. The method also includes controlling the adjustable optical beam deflector to direct the optical beam in response to the one or more quality metrics.

In another embodiment, a system includes a processor physically coupled to a substrate and including an optical transceiver for communicating information. The system includes at least one device physically coupled to the substrate and including an optical transceiver for communicating information. The system also includes an adjustable optical beam deflector physically coupled to the substrate for optically coupling the processor and the at least one device via an optical beam including a free-space optical beam portion. The system further includes a feedback system physically coupled to the substrate and including a non optical communication link for receiving information regarding the optical beam. The feedback system controls the adjustable optical beam deflector to direct the optical beam.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A system comprising:
   a first communication device physically coupled to a substrate and including an optical transmitter for communicating information;
   a second communication device physically coupled to the substrate and including an optical receiver for communicating information;
   an adjustable optical beam deflector physically coupled to the substrate for optically coupling the first communication device and the second communication device via an optical beam including a free-space optical beam portion; and
   a feedback system including a non-optical communication link for receiving feedback information regarding the optical beam, the feedback system controlling the adjustable optical beam deflector to direct the optical beam in response to the feedback information;
   wherein the adjustable optical beam deflector further comprises:
      a first portion that is transmissive to an optical beam and controllable to direct an optical beam in response to a control signal controlled by the feedback system; and
      a second portion including a reflective surface that reflects an optical beam, the reflective surface being controllable by the feedback system for directing the optical beam;
   wherein the first portion and the second portion are positioned such that an optical beam used for communication passes through the first portion that is transmissive to the second portion and is reflected by the reflective surface back through the first portion that is transmissive.

2. The system of claim 1 wherein:
   the first communication device includes an optical receiver and the second communication device includes an optical transmitter to transmit information to the first communication device via an optical beam including a free-space optical beam portion, the optical beam being deflected by the adjustable optical beam deflector.

3. The system of claim 1 wherein:
   the feedback information regarding the optical beam includes at least one of a group consisting of signal-to-noise ratio information of a received optical beam and optical signal intensity information of a received optical beam.

4. The system of claim 1 further comprising a sensor physically coupled to the substrate, the sensor monitoring an environmental condition and providing information of the environmental condition to the feedback system, the feedback system using the information of the environmental condition in controlling the adjustable optical beam deflector to direct the optical beam.

5. The system of claim 1 wherein the first communication device further comprises a processor, the feedback system including the processor to calculate control information from the received feedback information for controlling the adjustable optical beam deflector to direct the optical beam.

6. The system of claim 1 wherein the non-optical communication link is characterized as a wireless radio frequency link or a wired bus.

7. The system of claim 1 wherein each of the first communication device and the second communication device is implemented in circuitry mounted to the substrate or circuitry mounted to a plug-in card attached to the substrate.

8. The system of claim 1 wherein the the reflective surface is characterized as a micro-electro mechanical system (MEMS) controlled mirrored surface, the position of the micro-electro mechanical system (MEMS) controlled mirrored surface being controllable by the feedback system for directing the optical beam.

9. The system of claim 1 further comprising:
an accelerometer communicatively coupled to the feedback system, the accelerometer monitoring vibration and providing information to the feedback system for use in controlling the adjustable optical beam deflector to direct the optical beam.

10. The system of claim 1 wherein the first portion that is transmissive includes a third portion that is transmissive, wherein the second portion and the third portion are positioned such that an optical beam used for communication passes through the third portion and is not reflected by the second portion.

11. A system comprising:
a first communication device physically coupled to a substrate and including an optical transmitter for communicating information;
a second communication device physically coupled to the substrate and including an optical receiver for communicating information;
an adjustable optical beam deflector physically coupled to the substrate for optically coupling the first communication device and the second communication device via an optical beam including a free-space optical beam portion; and
a feedback system including a non-optical communication link for receiving feedback information regarding the optical beam, the feedback system controlling the adjustable optical beam deflector to direct the optical beam in response to the feedback information;
a temperature sensor communicatively coupled to the feedback system, the temperature sensor monitoring a temperature and providing information to the feedback system for use in controlling the adjustable optical beam deflector to direct the optical beam,
wherein the adjustable optical beam deflector further comprises:
a first portion that is transmissive to an optical beam and is controlled to direct an optical beam in response to a control signal; and
a second portion having a reflective surface for reflecting an optical beam the reflective surface being controllable by the feedback system for directing the optical beam;
wherein the first portion and the second portion are positioned such that an optical beam used for communication passes through the first portion that is transmissive to the second portion and is reflected by the reflective surface back through the first portion that is transmissive.

12. The system of claim 11 wherein the adjustable optical beam deflector further comprises:
a first portion that is transmissive to an optical beam and controllable to direct an optical beam in response to a control signal controlled by the feedback system; and
a second portion that reflects an optical beam.

13. The system of claim 11 wherein the adjustable optical beam deflector includes a micro-electro mechanical system (MEMS) controlled mirrored surface whose position is controlled by the feedback system.

14. The system of claim 11 wherein the feedback system further comprises detection circuitry for detecting an interruption in transmission of an optical beam and stopping transmission of the optical beam that is interrupted.

15. A method comprising:
communicating information from a first communication device physically coupled to a substrate to a second communication device physically coupled to the substrate by using an optical beam, the optical beam including a free-space optical beam portion, the optical beam being deflected by an adjustable optical beam deflector physically coupled to the substrate;
providing by the second communication device via a non-optical communication link, one or more quality metrics regarding a reception of the optical beam; and
controlling the adjustable optical beam deflector to direct the optical beam in response to the one or more quality metrics;
using an adjustable optical beam deflector that comprises at least two portions, a first portion being transmissive and a second portion being reflective;
for the first portion of the adjustable optical beam deflector that is transmissive, electrically biasing a layer of liquid crystal material to adjust a direction of transmission of the free-space optical beam portion; and
for the second portion of the adjustable optical beam deflector that is reflective, changing a position of a micro-electro mechanical system (MEMS) controlled mirrored surface to adjust a direction of the free-space optical beam portion;
wherein the optical beam passes through the layer of liquid crystal material, reflects off of the mirrored surface, and passes back through the layer of liquid crystal material.

16. The method of claim 15 further comprising:
sensing one or more environmental conditions; and
using the sensed one or more environmental conditions in the controlling the adjustable optical beam deflector to direct the optical beam.

17. The method of claim 15 further comprising:
using a conductor routed on the substrate as a portion the non-optical communication link.

18. The method of claim 15 wherein at least one of the first communication device and the second communication device is implemented on a plug-in circuit module inserted into a socket mounted to the substrate.

* * * * *